May 11, 1948.   W. F. LONGFIELD   2,441,543
COMBINED CLUTCH AND BRAKE
Filed Aug. 4, 1945   3 Sheets-Sheet 1

INVENTOR
WILLIAM F. LONGFIELD
BY Chas. H. Trotter
ATTORNEY

INVENTOR
WILLIAM F. LONGFIELD
BY Chas. H. Trotter
ATTORNEY

Patented May 11, 1948

2,441,543

UNITED STATES PATENT OFFICE 2,441,543

COMBINED CLUTCH AND BRAKE

William F. Longfield, Cleveland, Ohio, assignor to The Cleveland Punch & Shear Works Company, Cleveland, Ohio, a corporation of Ohio Application August 4, 1945, Serial No. 608,895

5 Claims. (Cl. 192—18)

1

This invention relates to combined clutches and brakes of the type generally employed to control the operation of metal working presses and the like.

Machines of this type generally comprise a reciprocal slide or plunger which is reciprocated by a crankshaft which is intermittently driven thru a clutch from a continuously running power shaft or motor. The slide may be operated in several different ways, depending on the manner in which the machine is being used and the type of work it is performing, but the mode of operation most generally employed is to intermittently reciprocate the slide thru one cycle, stopping it at the same point after each cycle of movement. The operation of the slide is controlled by a clutch which connects and disconnects the slide operating mechanism and the power source as desired, and a brake which stops the movement of the slide operating mechanism when the clutch is disengaged. The clutch and brake are interconnected in such a manner that the brake will be released as the clutch is engaged and vice versa. In modern practice the clutch and brake used for controlling the operation of machines of this type are combined with a single unit and mounted upon a shaft adjacent a constantly rotating flywheel which is rotatably supported upon the same shaft. The operation of the clutch and brake is controlled by suitable electrical apparatus which is manually operated to effect the engagement of the clutch and the release of the brake and is automatically operated to effect the release of the clutch and the application of the brake.

Modern sheet metal working presses exert enormous pressures, sometimes as high as several thousand tons. This requires a great amount of power and a large heavy flywheel and clutches and brake mechanism thru which the application of the power is controlled. These large flywheels and clutch and brake mechanisms take up a great deal of space and it is becoming increasingly difficult to mount them upon the presses in a satisfactory manner.

The principal object of my invention is to provide a more compact arrangement of a flywheel and clutch and brake mechanism without decreasing the capacity thereof so that they can be more readily mounted upon a press.

Another object of my invention is to provide a device of this character in which the clutch and brake mechanism is entirely enclosed within the flywheel.

Another object of my invention is to provide in a device of this character a flywheel which is supported on bearings at each end thereof thus eliminating all overhang of the flywheel and any tendency to tilt which prolongs the life of the bearings and permits the use of smaller bearings.

Still another object of my invention is to provide in a device of this character improved means for dissipating the heat generated therein during use.

Other and more specific objects of the invention will be apparent from the following specifications and the drawings forming a part thereof wherein.

Figure 1:
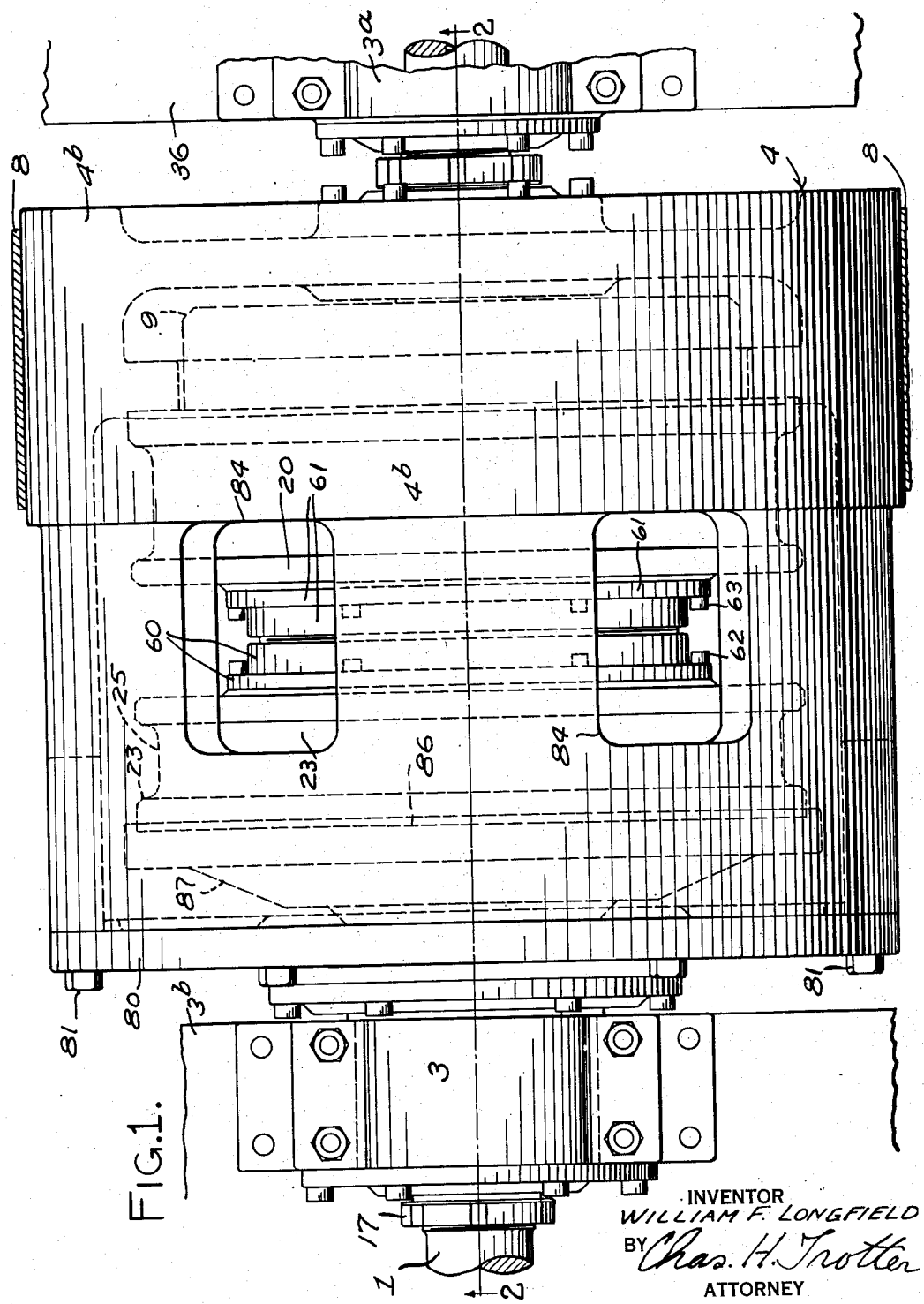
Fig. 1 is a side elevation of a flywheel and a combined friction disc clutch and brake constructed according to my invention.

Referring to the drawings by reference characters, the numeral 1 indicates a drive shaft which is rotatably supported by bearings 2 and 2ª, which are supported in brackets 3 and 3ª secured to uprights 3ᵇ of the press or other mechanism to which the device is applied. Suitable driving connections (not shown) are provided between the shaft 1 and the mechanism controlled and operated by the device. A flywheel 4 is rotatably supported at one end by a bearing 5 on the shaft 1 and at the other end by a bearing 6 on a hollow hub 7 which is rigidly secured in the support 3 by keys 7ª. In operation the flywheel 4 is constantly driven by any suitable source of power thru a belt 8. The flywheel 4 comprises a hub 4ª and a thick wide heavy peripheral portion 4ᵇ connected to the hub by a relatively thin web 4ᶜ, adjacent one end thereof, which has a plurality of bores 4ᵈ therethru for the circulation of air.

A cylinder block 9 is mounted upon the shaft 1, adjacent the web 4ᶜ of the flywheel 4, with one side abutting an annular shoulder 1ª on the shaft 1. Next to the cylinder block 9 upon the shaft 1 is a clutch hub 10. Abutting one end of the clutch hub upon the shaft 1 is an annulus 11, and abutting the annulus 11 upon the shaft 1 is a brake hub 12. The cylinder block 9, clutch hub 10, annulus 11, and brake hub 12 are all bolted together by bolts 13 and 14 and are keyed to the shaft 1 by keys 15 and 16. A nut 17 and the annular shoulder 1ª prevent longitudinal movement of this assembly upon the shaft 1 and hold it in its proper position with respect to the various other parts of the apparatus.

A clutch ring 18 is rigidly secured to the flywheel 4, to rotate therewith, by bolts 19. This clutch ring which surrounds the clutch hub 10 has an annular outwardly extending flange 20 at each edge thereof and a plurality of equally spaced apertures 21 therethru between the flanges. Between the apertures 21 the ring is internally toothed as indicated at 22.

A brake ring 23, similar to the clutch ring 18, surrounds the brake hub 12 and is rigidly mounted within the flywheel 4 by means to be hereinafter described. This ring 23 has a plurality of equally spaced apertures 25 therethru, and between these apertures is internally toothed as indicated at 26.

The clutch hub 10 is exteriorly toothed as indicated at 27. A centrally apertured disc 28, interiorly toothed as indicated at 29 is slidably, but non-rotatably, mounted upon the clutch hub 10 at one end thereof adjacent the cylinder block 9. A similar disc 30 interiorly, toothed as indicated at 31, is slidably, but non-rotatably, mounted upon the clutch hub 10 at the other end thereof adjacent the annulus 11. A plurality of similar centrally apertured discs 32, interiorly toothed as indicated at 33 are slidably, but non-rotatably, mounted upon the hub 10 between the discs 28 and 30.

A plurality of similar centrally apertured discs 34, exteriorly toothed as indicated at 35, are slidably, but non-rotatably, mounted within the clutch ring 18, and are alternately disposed with respect to the discs 28, 30 and 32. If desired the discs 34 may be faced with suitable friction material as is indicated at 36.

From the foregoing it will be apparent that the discs 28, 30, and 32 will always rotate with the clutch hub 10 and shaft 1, and the discs 34 will always rotate with the clutch ring 18 and flywheel 4, and that, when the discs 28, 30, 32, and 34 are all clamped tightly together by means hereinafter described, the shaft 1 will be rotated by the driven flywheel 4.

The periphery of the brake hub 12 is toothed as indicated at 37. A centrally apertured disc 38 interiorly toothed as indicated at 39 is slidably, but non-rotatably, mounted upon the brake hub 12 at one end thereof adjacent the annulus 11. A similar disc 40 interiorly toothed as indicated at 41 is slidably, but non-rotatably, mounted upon the brake hub 12 at the other end thereof. A plurality of similar centrally apertured discs 42, interiorly toothed, as indicated at 43, are slidably, but non-rotatably, mounted upon the brake hub 12 between the discs 38 and 40.

A plurality of similar centrally apertured discs 44, exteriorly toothed as indicated at 45, are slidable, but non-rotatably, mounted within the brake ring 23, and are alternately disposed with respect to the discs 38, 40 and 42. If desired the discs 44 may be faced with suitable friction material as indicated at 46.

From the foregoing it will be apparent that the discs 38, 40, and 42 will always rotate with the brake hub 12 and shaft 1, and the discs 44 will be held from rotary movement by the stationary brake ring 23 within which they are mounted. When the discs 38, 40, 42 and 44 are all clamped tightly together, by means hereinafter described, the rotation of the shaft 1 will be stopped, when the clutch is disengaged, and held stationary until the discs 38, 40, 42 and 44 are unclamped and the clutch engaged.

The peripheral portion of the annulus 11 is widened as indicated at 47 and is threaded as indicated at 48. Formed within the widened portion 47 are a plurality of equally spaced cylindrical recesses 49 open at one end. A block 50 having a threaded bore 51 therethru and an annular flange 52 at one end thereof is slidably mounted within each of the recesses 49. Studs 53 are screwed into the bores 51 of the blocks 50 and are pinned therein as indicated at 54. The studs 53 extend outwardly from the blocks 50 thru aligned apertures 55 in the discs 30 and 32 with their free ends abutting the disc 28. Studs 56 are screwed into the other ends of the bores 51 until they tightly engage the ends of the adjacent studs 53 thus locking them against free rotation. The studs 56 extend outwardly thru apertures in the closed end of the recesses 49 and thru aligned apertures 57 in the discs 38, 40 and 42. The studs 56 have heads 58 formed at their free ends, the inner faces of which bear against the outer face of the disc 40. Within each of the recesses 49 is a spring 59 which is under compression with one end bearing against the closed end of the recess 49 and the other end bearing against the flange 52 of the block 50 therein.

There are two interiorly threaded rings 60 and 61 screwed on to the threaded periphery 48 of the annulus 11. The ring 60 is adjacent the disc 38 and is bolted thereto by bolts 62; and the ring 61 is adjacent the disc 30 and is bolted thereto by bolts 63.

The outer surface of the disc 40 is kept in constant contact with the inner faces of the heads 58 on the studs 56 by a plurality of equally spaced spring pressed plungers 71 which are slidably mounted in hollow studs 72 carried by the annulus 11 and extending outwardly therefrom thru aligned apertures 73 in the discs 38 and 42.

The cylinder block 9 has a plurality of equally spaced smooth cylindrical bores 65, which are open at one end, formed therein. In each of these cylindrical bores 65 is a piston 66 having piston rings 67 in suitable grooves in the periphery thereof. Each piston 66 has a centrally located boss 68 formed integrally therewith. These bosses 68 extend outwardly thru the open ends of the cylindrical bores 65 and bear against the outer surface of the disc 28. The bosses 68 each have a drilled hole 69 therein within which is a compression spring 70. The springs 70 are provided to keep the bosses 68 of the pistons 66 in constant contact with the outer surface of the disc 28, thus clamping the disc 28 between the bosses 68 and the studs 53.

Fluid (preferably oil) under pressure is admitted to the cylindrical recesses 65 behind the piston 66, from any suitably controlled source not shown, thru a central passageway 75 in the shaft 1, which communicates thru a transverse passageway 76 in the shaft 1 with an annular chamber 77 around the shaft 1 within the clutch hub 10, which in turn is connected to the recesses 65 thru aligned bores 78 and 79 in the clutch hub 10 and cylinder block 9 respectively.

Figure 2:
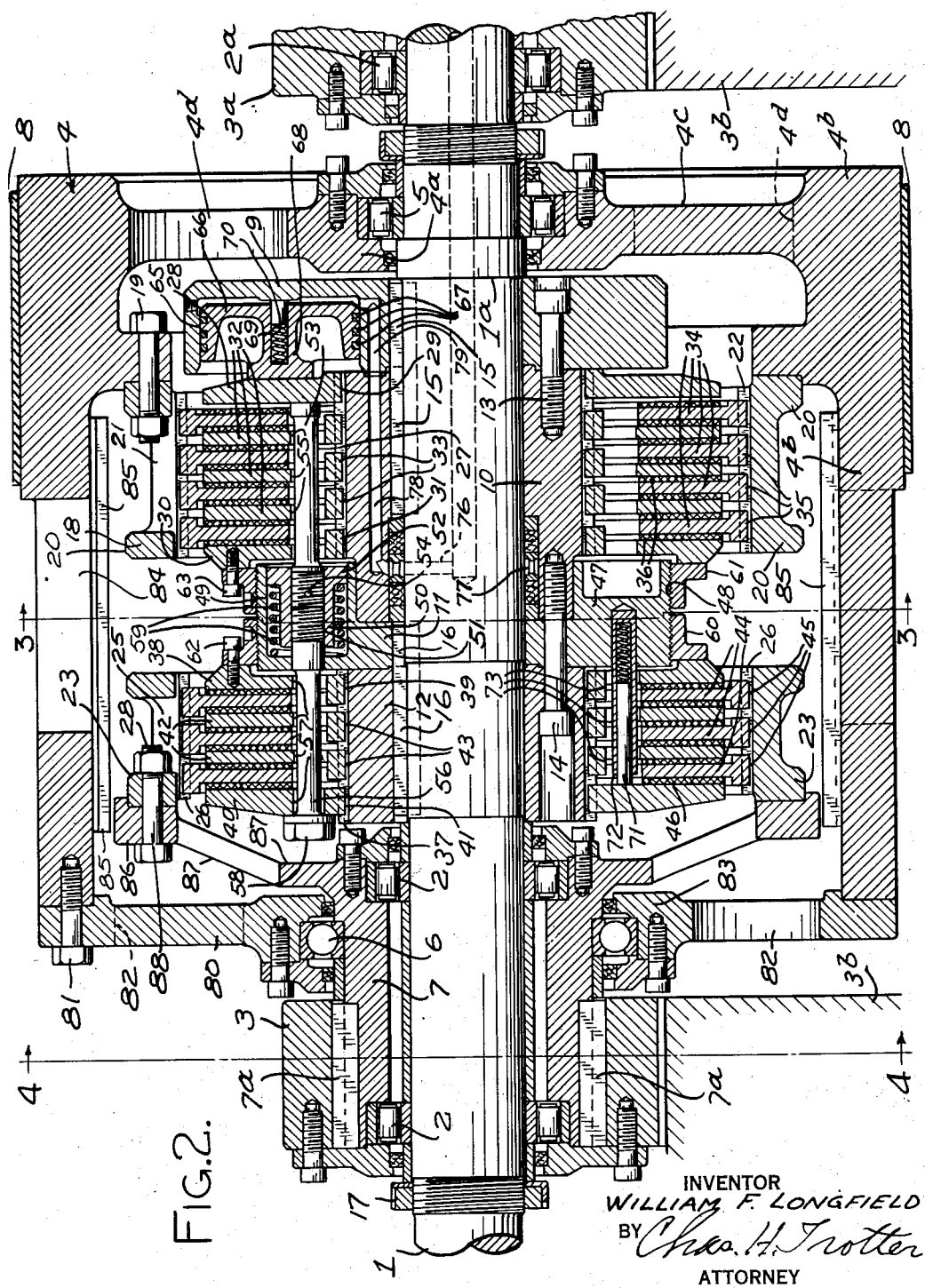
Fig. 2 is a central longitudinal section taken in a plane indicated by the line 2—2 of Fig. 1.
Figure 3:
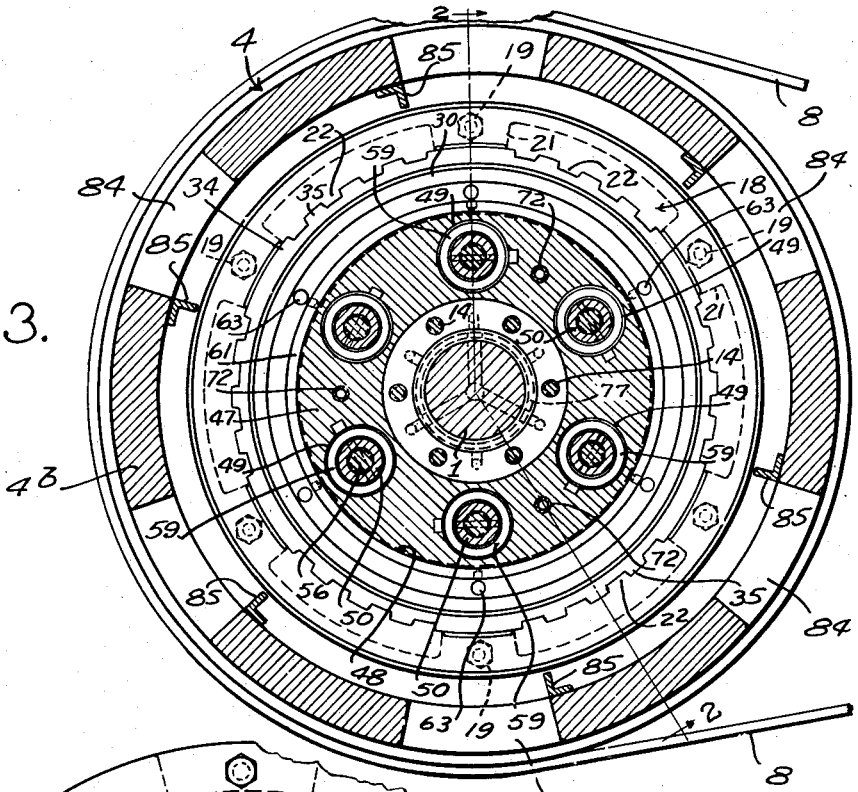
Fig. 3 is a transverse section taken on the line 3—3 of Fig. 2.
Figure 4:
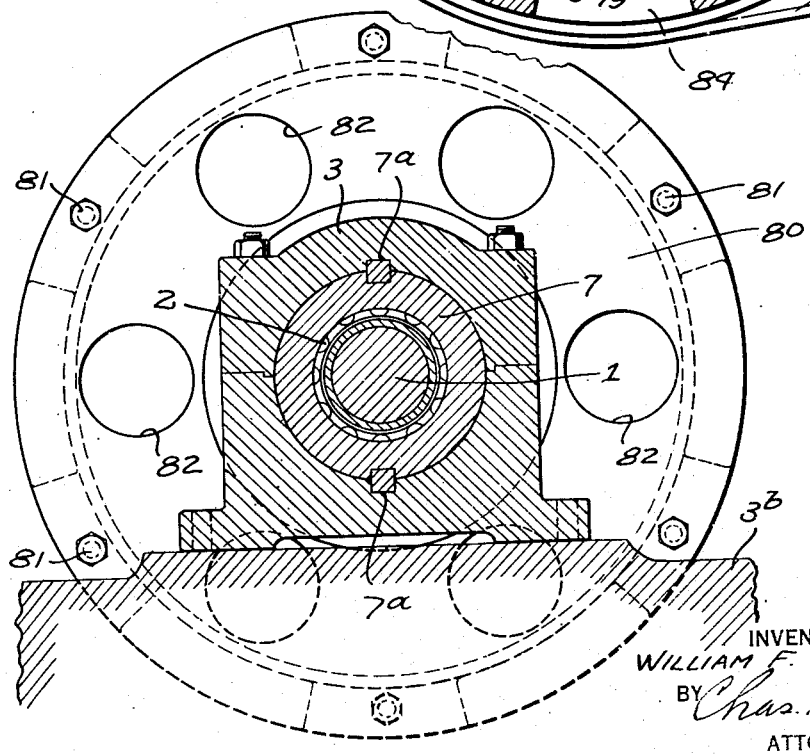
Fig. 4 is a transverse section taken on the line 4—4 of Fig. 2.

From the foregoing it will be seen that the springs 59 always bias the blocks 50 and the studs 53 and 56 carried thereby to the right, as viewed in Fig. 2, which in the absence of pressure behind the pistons 66, will clamp the discs 42 and 44 together between the discs 38 and 40, and will move the disc 28 and pistons 66 to the position shown in Fig. 2, unclamping the discs 32 and 34 between the discs 28 and 30. In other words, when the pressure behind the pistons 66 is released the springs 59 will apply the brake and disengage the clutch.

When fluid under pressure is admitted behind the pistons 66 they are moved to the left, Fig. 2, which moves the disc 28 to the left also, clamping the discs 32 and 34 tightly together between the discs 28 and 30, thus engaging the clutch. This movement of the disc 28 simultaneously forces the studs 53, blocks 50 and studs 56 to the left compressing the springs 59 and unclamping the discs 42 and 44 between the discs 38 and 40, thus releasing the brake.

The springs 70 in the piston bosses 68 and the spring pressed plungers 71 holding the disc 40 against the heads 58 on the studs 56 are not necessary for the proper operation of the device but are provided to eliminate noise during operation.

The flywheel 4 has a cover plate 80 secured to the open end thereof by bolts 81. This cover plate 80 has a plurality of apertures 82 therethru, and a hub portion 83 formed thereon. The bearing 6 is mounted in a suitable groove in the hub 83, and on the hollow hub 7. As previously stated the hollow hub 7 is rigidly held in the support 3 by keys 7ª. The peripheral portion 4ᵇ of the flywheel while illustrated as comparatively thin, may be of any desired thickness necessary to give the flywheel the required capacity. It will vary with different installations. A plurality of spaced apertures 84 extend thru the peripheral portion or rim of the flywheel and a fan blade 85 is secured within the flywheel adjacent each aperture 84. As the flywheel rotates air will be circulated within the flywheel about the clutch and brake parts therein and thru the openings 4ᵈ, 82 and 84, which will dissipate the heat generated in these parts during operation.

As clearly shown in Fig. 2, the bearings 2 which rotatably support one end of the drive shaft 1 are mounted in suitable recesses in the ends of the hollow stationary hub 7.

The hub 7 extends through the cover plate 80 into the interior of the flywheel and has a ring 86 rigidly secured thereto by a perforated cone shaped disc 87. The brake ring 23 is rigidly secured to the ring 86 by bolts 88.

The specific clutch and brake mechanism shown and described herein is substantially the same as that disclosed in my co-pending application Serial No. 590,089, filed April 24, 1945, now abandoned, and per se forms no part of the present invention as obviously various other types of combined clutches and brakes may be used in place thereof. For example the combined clutch and brake mechanism disclosed in my co-pending application Serial No. 589,505, filed April 21, 1945, now abandoned, could be used equally well if desired.

From the foregoing it will be apparent to those skilled in this art that I have provided a very simple, compact and efficient mechanism for carrying out the objects of my invention.

It is to be understood that I am not limited to the specific construction shown and described herein as various changes may be made therein within the scope of the appended claims.

Having thus described my invention I claim:

1. In a device of the character described the combination of a rigidly supported hollow hub, a shaft having one end rotatably supported within said hollow hub, and the other end rotatably supported by a fixed support, a hollow flywheel having one end rotatably supported on the exterior of said hollow hub and the other end rotatably supported on said shaft, and a clutch and brake mechanism surrounding said shaft within said flywheel, said clutch and brake mechanism including a stationary member rigidly secured to said hollow hub within said flywheel.

2. In a device of the character described the combination of a pair of spaced fixed supports, an apertured hub rigidly secured to one of said supports, a shaft having one end thereof extending through said apertured hub and rotatably supported thereby and the other end thereof extending through said other fixed support and rotatably supported thereby, a hollow flywheel disposed between said fixed supports with one end thereof rotatably mounted on the exterior of said apertured hub and the other end thereof rotatably mounted on said shaft, a combined clutch and brake mechanism disposed within said hollow flywheel, said mechanism including an interiorly splined ring rigidly secured to said apertured hub.

3. In a device of the character described the combination of a rigidly supported stationary apertured hub, a shaft extending through said hub and rotatably supported thereby, a hollow flywheel having one end thereof rotatably mounted upon the exterior of said apertured hub and the other end thereof rotatably mounted upon said shaft, a flange rigidly secured to said apertured hub within said flywheel, and cooperating means between said flange and said shaft within said hollow flywheel operative to stop the rotation of said shaft.

4. In a device of the character described the combination of a rigidly supported stationary apertured hub, a shaft extending through said hub and rotatably supported thereby, a hollow flywheel having one end thereof rotatably mounted upon the exterior of said apertured hub and the other end thereof rotatably mounted upon said shaft, a flange rigidly secured to said apertured hub within said flywheel, an internally splined ring rigidly secured to said flange, an externally splined hub rigidly secured to said shaft within said hollow flywheel, a first set of friction discs slidably but non-rotatably carried by said internally splined ring, a second set of friction discs slidably but non-rotatably mounted upon said externally splined hub, said first set of discs and said second set of discs being alternately disposed with respect to each other, and means operative to clamp all of said discs together to stop the rotation of said shaft.

5. In a device of the character described the combination of a rigidly supported stationary apertured hub, a shaft extending through said hub and rotatably supported thereby, a hollow flywheel having one end thereof rotatably mounted upon the exterior of said apertured hub and the other end thereof rotatably mounted upon said shaft, and a combined clutch and brake mechanism operative to control the rotation of said shaft disposed within said hollow flywheel.

WILLIAM F. LONGFIELD.

REFERENCES CITED

The following references are of record in the file of this patent:

UNITED STATES PATENTS

| Number | Name | Date |
| --- | --- | --- |
| 1,317,322 | Schipper | Sept. 30, 1929 |
| 1,515,401 | Norris | Nov. 11, 1924 |
| 1,528,973 | Groene | Mar. 10, 1925 |
| 1,835,153 | Greve | Dec. 8, 1931 |
| 2,242,396 | Johansen | May 20, 1941 |
| 2,290,542 | Criley | July 21, 1942 |